Patented June 30, 1953

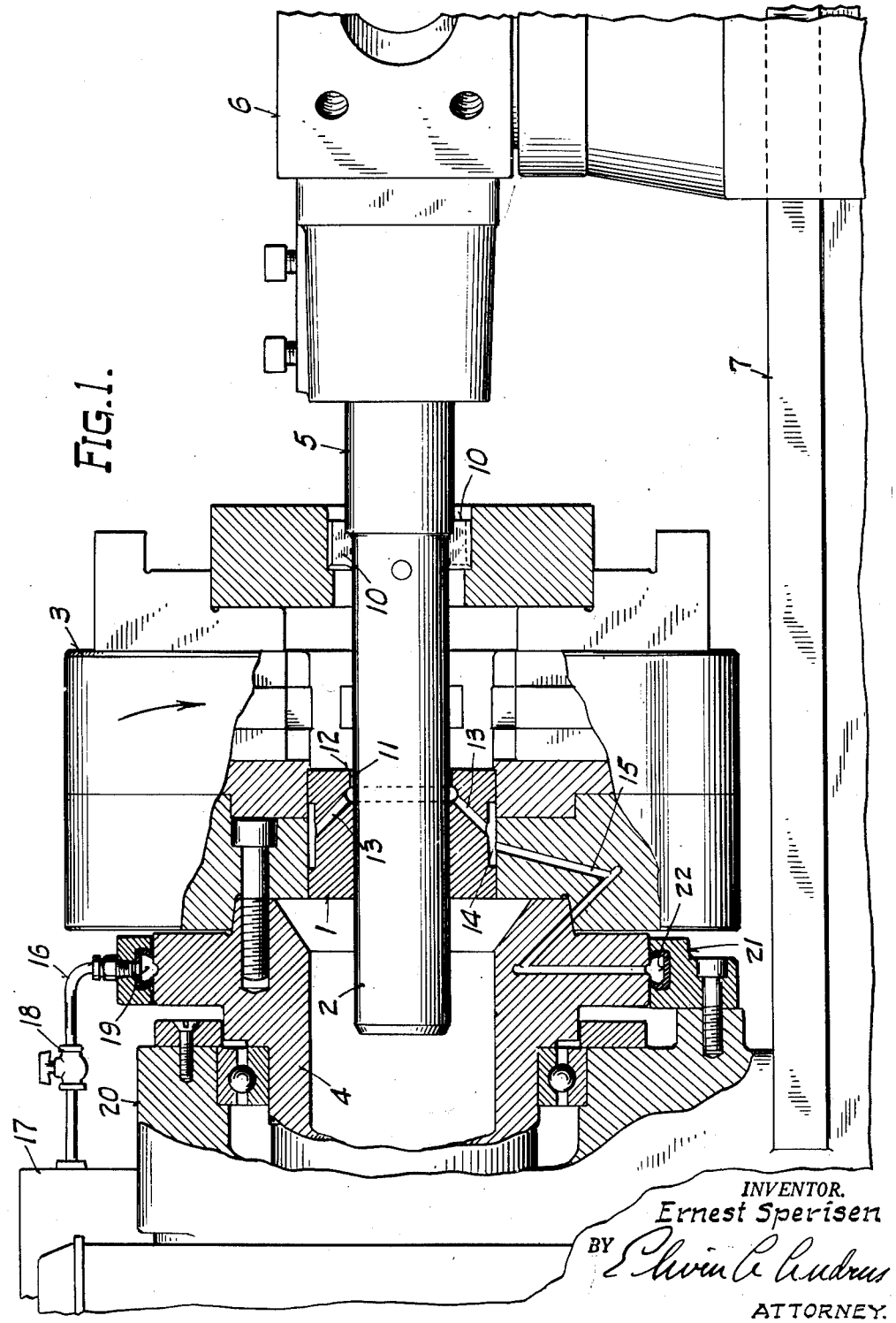

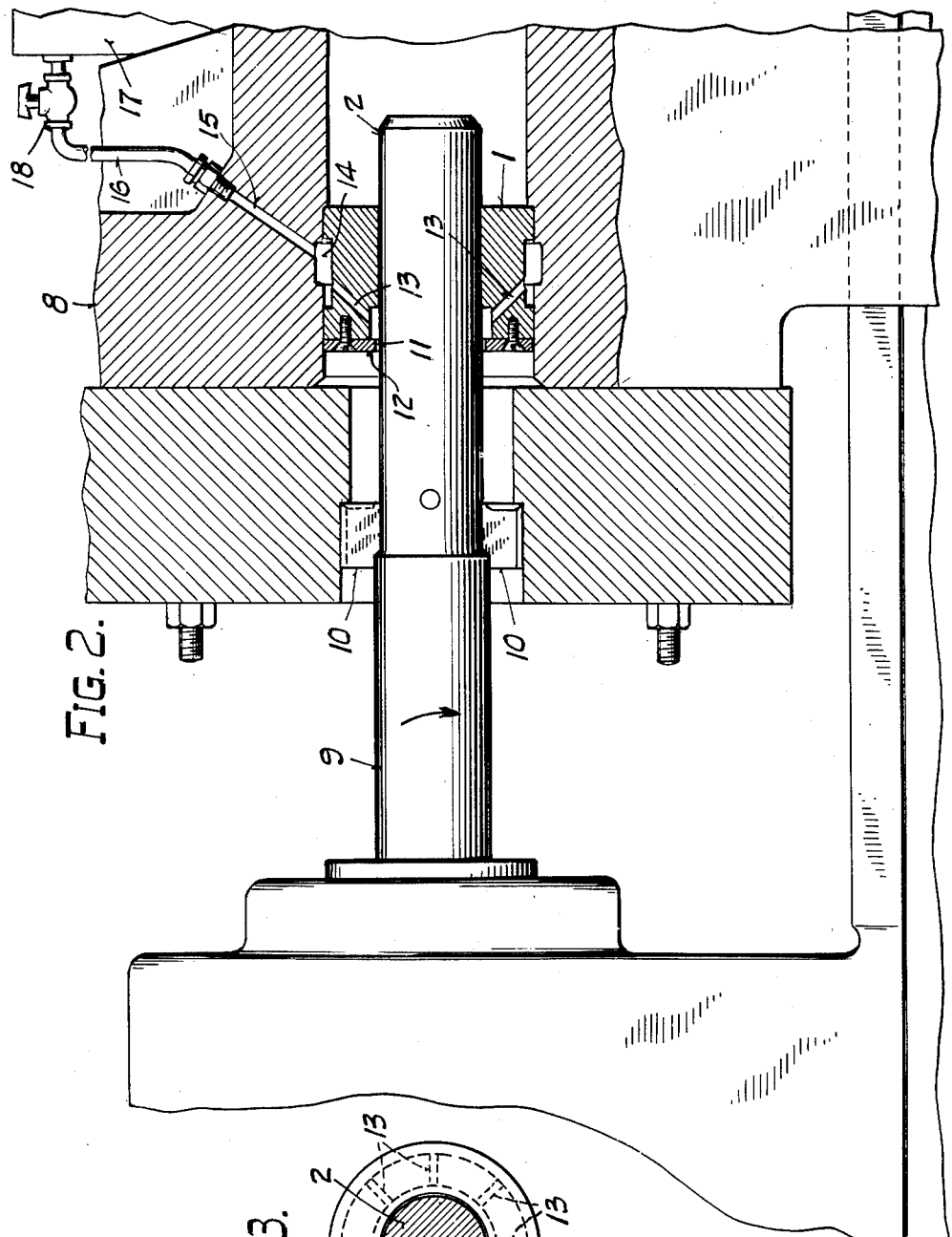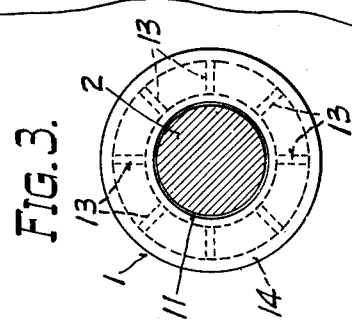

2,643,554

UNITED STATES PATENT OFFICE 2,643,554

BORING BAR PILOT SUPPORT

Ernest Sperisen, Madison, Wis., assignor to Gisholt Machine Company, Madison, Wis., a corporation of Wisconsin Application January 14, 1948, Serial No. 2,291

2 Claims. (Cl. 77—3)

1

This invention relates to a boring bar pilot support.

The principal object of the invention is to more accurately support the pilot and thereby provide greater accuracy in boring.

Another object of the invention is to provide a simple means for preventing chips and foreign matter from entering the pilot bearing along with the pilot.

Another object is to provide a simple and efficient support structure for the pilot.

In carrying out the invention foreign matter on the surface of the pilot is removed therefrom by means of a constant or intermittent blast of air impinging thereon as the pilot progressively enters its bearing.

By reason of the invention it is possible to construct the pilot and its bearing with closer clearance therebetween and to thereby obtain substantially greater accuracy in the support of the pilot.

The invention is illustrated in the accompanying drawing in which:

Figure 1 is a side elevation of parts of a turret lathe with parts broken away and sectioned to show the pilot bearing construction;

Fig. 2 is a similar view of a horizontal boring mill showing a modified pilot bearing construction; and Fig. 3 is a front elevation of the bearing showing the pilot in section and the passages in dotted line.

The invention utilizes a journal bearing for the pilot 2.

In Fig. 1 the journal bearing 1 is secured within the central bore of a work chuck 3 mounted on the end of a rotary lathe spindle 4, and the pilot 2 is carried at the end of a longitudinally movable boring bar 5 secured to a turret 6 or the like of a lathe 7.

In Fig. 2 the journal bearing 1 is secured axially of the work support 8 of a horizontal boring mill, and the pilot 2 is carried at the end of a rotary longitudinally movable boring bar 9.

The bearing 1 and pilot 2, in each instance, are disposed in axial alignment with each other so that the pilot enters through the bearing as the cutters 10 of the boring bar advance through the work. The pilot serves to steady the boring bar and keep the cutters in alignment with the projected opening to be bored in the workpiece at all times.

Heretofore, ordinary journal bearings have not been practical as supports for boring bar pilots due to the fact that the pilot carried into the bearing chips and foreign matter which injured the bearing and made it necessary to provide such large bearing clearances that accuracy of support for the pilot was not obtainable. This was particularly so in a lathe since the bearing or the boring bar and its pilot was non-rotary and would readily retain foreign matter on their upwardly facing bearing surfaces.

The present invention provides a simple and efficient means for removing all foreign matter from the surface of the pilot immediately ahead of its point of progressive entry into the bearing. The use of the invention makes it possible to employ smaller bearing clearances and thereby to provide more accurate support for the pilot.

In carrying out the invention a circumferential nozzle 11 is provided at the front end of the bearing 1 with the mouth of the nozzle facing longitudinally outward in a direction opposite to the direction of movement of the pilot 2 in entering the bearing.

The nozzle 11 may be constructed as an inwardly facing groove extending continuously around the inside of the bearing 1 near its forward end, with the mouth of the nozzle provided by machining the front lip 12 to a larger internal diameter than that of the bearing.

In general, it is sufficient opening for the mouth of the nozzle if the lip 12 has about two thousandths of an inch clearance from the pilot 2. The bearing may have substantially less than a thousandth of an inch clearance from the pilot.

The nozzle construction of Fig. 2 differs from that of Fig. 1 only in the fact that the lip 12 is provided by a plate member secured to the front of the bearing and partially closing a recess in the bearing to complete the nozzle groove referred to and provide the mouth for the nozzle, while in Fig. 1 the lip 12 is an integral part of the bearing 1 and the nozzle groove and mouth are formed wholly by machining. The nozzle may also be constructed of parts separable from the bearing as to include a second member, not shown but similar to the plate member providing lip 12 of Fig. 2, and which closely fits pilot 2 to prevent escape of fluid toward the end of pilot 2 as does bearing 1 shown after the pilot has entered the bearing.

Air is supplied to nozzle 11 by a plurality of feeder passage 13 disposed radially and preferably diagonally in the bearing. A sufficient number of passages 13 should be employed to distribute the air uniformly around the circumference and provide a uniform blast of air forwardly out of the mouth of the nozzle throughout the circumference.

A header chamber 14 is provided at the outer circumference of the bearing member 1 to supply air equally to the several passages 13. The chamber 14 may constitute merely a recess in the outer circumference of the bearing member which is closed by the body of the work chuck 3 or work support 8 in which the bearing is mounted.

If desired the header chamber 14 may constitute a recess in the body of the outer member surrounding the bearing member 1 instead of a recess in the bearing member itself or in combination with such a bearing member recess, as shown in Fig. 2.

Air is supplied to header chamber 14 through a passage 15 in the body member surrounding the bearing 1 and which connects with a conduit 16 leading from a tank 17 of compressed air or other suitable source of air pressure.

A valve 18 is disposed in conduit line 16 for manually or automatically controlling the supply of air to the nozzle. In practice, the air may be supplied either continuously during the boring operation at a substantially constant rate or it may be supplied in rapidly intermittent blasts to more effectively dislodge foreign matter from the pilot. If the air is supplied before the pilot reaches the nozzle, the end of the pilot in passing the nozzle will be cleaned of foreign matter and will cause a blast of air to be directed toward the bearing to clean the latter as well.

Since in the lathe illustrated in Fig. 1 the work chuck 3 and its passage 15 rotate with the spindle 4 it is necessary to provide a second sealed header 19 between some part of the rotating mechanism and a stationary member.

The header 19 may be located conveniently between the chuck 3 and the wall of the headstock 20, and be constructed as a hollow ring member 21 secured to the headstock and encircling the end of spindle 4. Passage 15 in this embodiment leads through the body of the chuck 3 into the spindle 4 and then radially into the header chamber 19 in member 21.

A suitable seal 22 may be provided in chamber 19 to prevent leakage of air between the relatively rotating surfaces.

The air pressure employed should be sufficient to clean the pilot of foreign matter as it enters the bearing.

The invention may have various embodiments within the scope of the accompanying claims.

I claim:
1. In a machine tool of the class described including a boring bar and a work support having a central opening to receive said bar, said work support and boring bar being relatively rotatable and axially movable on the longitudinal axis of the bar and the bore to be formed in the work, said boring bar being supported at one end and adapted to carry a tool adjacent thereto and having a cylindrical pilot at the other end thereof disposed to pass through a rough opening in the work as the tool approaches the work, an annular nozzle supported and disposed to receive said pilot prior to the engagement of the tool with the work, said nozzle having a circular chamber connected to a supply of fluid under pressure and defined by annular members dimensioned to fit said pilot and direct the discharge of fluid therebetween along the surface of the pilot to remove foreign matter therefrom, and a journal bearing carried within the opening of said work support to receive and guide said pilot after the end of the pilot has passed the chamber of said nozzle and foreign matter has been removed by the fluid from the end of the pilot before entering said bearing.

2. The invention as defined in claim 1 wherein a clearance is provided between the end of the pilot and the annular member which is first entered by the end of the pilot, whereby the end of the pilot in approaching the other annular member effects a construction between the pilot and said other member which at least momentarily causes a part of the fluid to be directed through said bearing to remove any foreign matter therefrom before said pilot enters the same.

ERNEST SPERISEN.

References Cited in the file of this patent

UNITED STATES PATENTS

| Number | Name | Date |
|---|---|---|
| 1,056,282 | Koerting et al. | Mar. 18, 1913 |
| 1,099,500 | Hesketh | June 9, 1914 |
| 1,846,986 | Bogart | Feb. 23, 1932 |
| 1,906,715 | Penick | May 2, 1933 |
| 2,295,856 | Mallory | Sept. 15, 1942 |
| 2,383,094 | Walder | Aug. 21, 1945 |
| 2,429,516 | Jergens | Oct. 21, 1947 |

FOREIGN PATENTS

| Number | Country | Date |
|---|---|---|
| 306,295 | Germany | June 27, 1918 |